(12) United States Patent
Lotz

(10) Patent No.: US 7,597,294 B2  
(45) Date of Patent: Oct. 6, 2009

(54) LEVELING SYSTEM FOR DOMESTIC APPLIANCES

(75) Inventor: Joachim Lotz, Gevelsberg (DE)

(73) Assignee: A-Z Ausruestung und Zubehoer GmbH & Co. KG, Hattingen (DE)

( * ) Notice: Subject to any disclaimer, the term of this patent is extended or adjusted under 35 U.S.C. 154(b) by 450 days.

(21) Appl. No.: 10/545,320

(22) PCT Filed: May 31, 2003

(86) PCT No.: PCT/EP03/05732

§ 371 (c)(1),
(2), (4) Date: Apr. 26, 2006

(87) PCT Pub. No.: WO2004/072540

PCT Pub. Date: Aug. 26, 2004

(65) Prior Publication Data

US 2007/0023590 A1     Feb. 1, 2007

(30) Foreign Application Priority Data

Feb. 14, 2003    (DE)     ............................... 203 02 388

(51) Int. Cl.
*F16M 11/24*     (2006.01)

(52) U.S. Cl. ............. 248/188.3; 248/188.1; 248/188.2; 248/649; 248/650; 312/255; 182/200; 182/202

(58) Field of Classification Search .............. 248/188.3, 248/188.1, 188.2, 188.4, 188.8, 646, 649, 248/650, 446; 182/200, 202, 203; 312/255; 280/6 R  
See application file for complete search history.

(56) References Cited

U.S. PATENT DOCUMENTS

| | | | | |
|---|---|---|---|---|
| 2,635,838 A | * | 4/1953 | Branson | ...................... 248/562 |
| 3,954,241 A | | 5/1976 | Carlson | |
| 3,991,962 A | * | 11/1976 | Kovats | .................... 248/188.5 |
| 4,262,870 A | * | 4/1981 | Kretchman et al. | ...... 248/188.3 |
| 4,637,581 A | * | 1/1987 | Wong | ...................... 248/188.3 |
| 4,770,275 A | | 9/1988 | Williams | |
| 4,801,114 A | * | 1/1989 | Price | ...................... 248/188.3 |
| 5,344,116 A | | 9/1994 | Winkler | |
| 5,697,586 A | * | 12/1997 | Lybarger | ................. 248/188.4 |

(Continued)

FOREIGN PATENT DOCUMENTS

DE     23 27 053     12/1974

(Continued)

*Primary Examiner*—J. Allen Shriver  
*Assistant Examiner*—Todd M. Epps  
(74) *Attorney, Agent, or Firm*—Reed Smith LLP (57) ABSTRACT

A leveling system for household appliances comprises appliance feet which are arranged at the underside of the household appliance and which are adjustable in height at least partly by an actuation member and therefore make it possible to adjust the height of the household appliance and/or to adapt to unevenness in floors. According to the invention, the actuation member is a traction element and the appliance feet which are adjustable in height by the traction element have, in each instance, a cylindrical housing which is fastened to the underside of the household appliance and in which there is arranged a piston which carries the appliance foot plate, and the piston has a receptacle for the height-adjustable arrangement of the shaft of an appliance foot plate.

11 Claims, 4 Drawing Sheets

U.S. PATENT DOCUMENTS 6,009,815 A * 1/2000 Hartman .................. 108/147

FOREIGN PATENT DOCUMENTS

| DE | 35 19 479 | 12/1986 |
| DE | 295 12 617 | 11/1995 |
| DE | 195 28 901 | 2/1997 |
| DE | 196 06 460 | 8/1997 |
| EP | 0 544 175 | 6/1993 |

* cited by examiner

LEVELING SYSTEM FOR DOMESTIC APPLIANCES

CROSS-REFERENCE TO RELATED APPLICATIONS

This application claims priority of International Application No. PCT/EP2003/005732, filed May 31, 2003 and German Application No. 203 02 388.9, filed Feb. 14, 2003, the complete disclosures of which are hereby incorporated by reference.

BACKGROUND OF THE INVENTION a) Field of the Invention

The invention is directed to a leveling system for household appliances, such as washing machines, comprising appliance feet which are arranged at the underside of the household appliance and which are adjustable in height at least partly by means of an actuation member and therefore make it possible to adjust the height of the household appliance and/or to adapt to unevenness in floors, wherein the actuation member is a traction element and the appliance feet which are adjustable in height by means of the traction element have, in each instance, a cylindrical housing fastened to the underside of the household appliance, in which cylindrical housing there is arranged a piston which carries the appliance foot plate, wherein the traction element joins the pistons of the appliance feet that are adjustable in height by means of the traction element.

b) Description of the Related Art

A leveling system for installable or stackable household appliances in which the height adjustment at least of the rear appliance feet can be carried out from the front side of the appliance by means of an actuation device is already known from DE 35 19 479 A1. For this purpose, there is an actuation member that is accessible to the user and that communicates with the rear appliance feet via a closed liquid system. With this known device, household appliances whose appliance feet are no longer accessible at their rear end after the household appliances have been integrated or stacked underneath in a kitchen installation can also be adapted in a corresponding manner with respect to installation height.

It is disadvantageous that it is relatively difficult to keep the arrangement liquid-tight.

Arrangements working with mechanical gear units are also already known, e.g., from DE 196 06 460 A1. However, appliance feet that are provided with mechanical gear units in this way are relatively elaborate and expensive and are sometimes also difficult to operate.

According to EP 0 544 175 A1, the problem of compensating for differences in height due to uneven floors with inaccessible appliance feet is solved by arranging a spring element between an upper part of the foot and a lower part on the floor side. However, it is admitted in the reference that a correct choice of spring element based upon the weight of the appliance is necessary. When dynamic loading occurs in addition to the static load, the reference proposes connecting an elastically deformable element in parallel to the spring. However, a foot of this type which is individually spring-mounted and provided with mechanical damping is dependent upon the weight of the appliance and therefore cannot be used for a stacked configuration, that is, it cannot be applied in vertically oriented washer/dryer combinations.

This is also true of a self-adjusting, displaceable foot arrangement known to the present applicant which comprises a spring/damping element and a conventional appliance foot. The biased or pre-tensioned spring which is accommodated in a cylindrical housing acts on the damping element and on the appliance foot and compensates for unevenness in floors up to about +/−10 mm. Stable operation of the automatic machine is achieved by means of a load-dependent shock absorbing function. The spring/damping element is designed for installation inside of the appliance housing at the rear right-hand or rear left-hand side depending on the loading of the foot and based on the drum dynamics in combination with the suspension of the washing machine drum and its distribution of mass. Fastening (by screwing) of the foot of this automatic machine is carried out from the underside of the machine.

Another arrangement that is known to the present applicant comprises a mechanical rocker without elastic rigidity, but with frictional damping by means of corresponding guides. A fixed rod assembly which joins the two feet to one another is used for this purpose. The disadvantage here is that the system is dependent upon the installation space and foot spacing because of the fixed rod assembly.

U.S. Pat. No. 3,954,241 discloses a leveling system for an appliance, such as a washing machine, comprising appliance feet 14, 16 which are arranged at the underside of the appliance. Two of the appliance feet are accessible at the front end of the appliance and are adjustable in height by rotation within a thread and, in this way, allow the front end of the appliance to be adjusted in height and/or make it possible to adapt to uneven floors, while two rear appliance feet 16 enable automatic height compensation by means of a pull cable. The appliance feet 16 which are adjustable in height by means of the pull cable have, in each instance, a cylindrical housing that is fastened to the rear side near the underside or directly to the underside of the appliance. A piston carrying the appliance foot plate 34 is arranged in this cylindrical housing and the pull cable 18 connects the pistons of the two appliance feet 16 with one another. Under operating load, friction prevents a movement of the cable. The rear feet cannot be jointly changed in height in the same direction for adjusting the height of the appliance. This is disadvantageous for bottom stacking.

U.S. Pat. No. 4,770,275 discloses a leveling system for a ladder comprising feet 3 which are arranged at the underside 10 of the ladder and which are adjustable in height by means of an actuating member 4 in the form of a wire cable so that it is possible to adjust the height of the feet of the ladder mutually and accordingly adapt to uneven ground or floors. The actuating member is a traction member 4 and the feet 3, which are adjustable in height by means of the traction member 4, have, in each instance, a cylindrical housing 1 which is fastened to the underside of the ladder, a piston 3 carrying the foot plate 12 being arranged in the cylindrical housing 1. The piston 3 has a threaded bore hole for receiving a bolt 10 having at its ball-shaped end a foot plate 12 that is swivelable around the ball to a limited extent. In this case also it is not possible to change height in the same direction, which would also not be useful for a ladder. Again, the movement of the traction member is prevented under load by a friction arrangement. In addition, the feet of a ladder are always easily accessible so that the problem of inaccessible feet does not arise in this case.

This is a different matter when the domestic device is a household appliance in which at least two of the feet, namely, the rear feet, are inaccessible at least when the appliance is installed in a kitchen. In this case, it would also be useful if it were possible to carry out adjustment or, if necessary, preadjustment, of the height of the feet in the same direction in addition to leveling (in opposite directions) in order to compensate for uneven floors.

The system according to the above-cited DE 35 19 479 already has many basic advantages; for example, a self-regulating effect occurs in the arrangement between the two appliance feet in the rear area of the appliance. However, the known arrangement does not have sufficient long-term stability with respect to construction. Exactly dimensioned, closely toleranced metal component parts are required in order to maintain liquid pressure over long periods of time and are expensive to produce. When the system is leaky, it is impossible to restore the foot adjustment.

OBJECT OF THE INVENTION

It is the primary object of the invention to provide a leveling system for household appliances of the type mentioned in the beginning in which it is still possible, in principle, to restore the foot adjustment height even in the event of failure of arrangements of this kind which carry out automatic leveling. Further, the arrangement should be able to be developed in such a way with respect to material and processing that expensive metal parts can be replaced by inexpensive plastic parts which can be produced by injection molding and which can be connected to one another in a simple manner. Further, the particular problems that occur in hydraulic arrangements such as leakage problems, are successfully overcome. Finally, dependence on alternating loads, which had to be taken into account in the previously known leveling systems, is avoided to a great extent, i.e., also lateral loading due, for example, to a washing machine basket does not lead to an immediate re-leveling of the household appliances.

SUMMARY OF THE INVENTION

The object according to the invention is met in that the piston has a receptacle for the height-adjustable arrangement of the shaft of an appliance foot plate.

In this way, even in the event of malfunction, e.g., tearing or breaking of the traction element, it is possible to readjust the foot plate by means of an adjustable shaft in such a way that leveling is also achieved.

This is achieved in that (only) the two rear appliance feet have, in each instance, a cylindrical housing and these cylindrical housings are in a tractive connection with one another by means of a mechanical chain connection, belt connection or cable connection, the tractive connection having a force component in direction of the cylindrical housing axis. In this way, without hydraulic arrangements, the two appliance feet mutually influence one another in such a way that leveling takes place.

According to a further development of the invention, the belt or the like can be fastened to the movable piston and guided around a deflection arrangement that is formed or carried by the stationary cylindrical housing. Alternatively, the belt or the like can be fastened in the stationary cylindrical housing and guided around a deflection arrangement that is formed or carried out by the movable piston.

The mechanical chain connection, belt connection or cable connection and also the cylinder or cylindrical housing can have an inhibiting or damping device such as a friction device which inhibits the passage of the chain, belt or cable or the displacement of the piston in the cylinder. Therefore, transient or small one-sided loads do not immediately lead to a leveling change, but to long-lasting and large changes.

The friction device can be formed by friction rings, such as O-ring seals, which are carried in ring grooves in the circumferential surface of the piston. Alternatively, the mechanical connection such as the belt, or the like, connecting the pistons can be influenced by a friction device as was mentioned above.

For purposes of an economical manufacture, it is advantageous when the arrangement comprising the cylinder and piston is made at least partially of plastic. The piston can support a cross-pin or a roller which supports or deflects the belt or the like. The bearing support or deflection device of the cylindrical housing is advantageously arranged in the vicinity of the plane of the underside or bottom plate carrying the appliance feet because this then also reduces the lever forces acting on the feet which could otherwise lead to a bending of the bottom plate.

The cylindrical housing could also have a fastening device such as a clamp or wire clip for fastening the cable, belt or chain when fastening is not carried out at the piston. The two appliance feet are oriented in order to adapt to unevenness in the floor in that the cable or the like is guided by means of a deflection device formed by the piston.

In the event of failure of the leveling system, e.g., if the belt, cable or chain should tear due to unusually high loading, it is advantageous when the housing for the piston forms stop devices for limiting the travel of the piston. It is then always possible to carry out leveling manually because of the foot plate/shaft arrangement which is adjustable with respect to the piston.

Insofar as the cylindrical housing is open at its free end, which has advantages with respect to design, it is advantageous when the stop devices are formed by a cotter pin or bolt which extends through the cylinder walls and which can easily be inserted and removed.

As was already mentioned, it is advantageous for reasons of stability when the cylindrical housing has an opening in its lower area near the fastening through which the belt or the like is guided and deflected. This is a particularly simple design and causes less bending load on the feet.

The cylindrical housing advisably has a shoulder which is penetrated by the shaft of the foot plate and which is made of plastic or metal. This shoulder can be connected to the cylindrical housing by gluing, welding, clipping in, or screwing or can be formed integral therewith. When provided with a circumferential thread, the shoulder is used for screwing on a fastening nut.

The leveling system can have a belt made of steel or of oriented or fiberglass-reinforced plastic such as is often used for packing tape.

When the leveling system is intended not only to compensate for unevenness in floors, but also to raise and lower generally, it is advantageous to provide tensioning devices that are accessible from the device side. This makes it possible to pull the belt, cable or chain e.g. parallel to the bottom surface, so as to change the effective height adjustment of the appliance feet suspended at the two ends of the belt.

Previously, only floor-standing devices exclusively with compensation systems for adapting to unevenness in floors or only integrated devices (in which the rear feet are inaccessible) exclusively with two adjusting gear units in which the two rear feet had to be adjusted individually were used in commercial washing machine systems. The present invention makes it possible to combine both systems as is shown in the embodiment form mentioned above. This embodiment form can be further refined in that the tensioning device comprises a slide gear unit which is axially displaceable on a slide and which may also have a slip clutch according to another embodiment form. This arrangement can be constructed in accordance with Patent 195 28 901, but can also be constructed in particular according to the following more detailed description. A gear unit of this kind, possibly with a slip clutch, shortens or lengthens the belt length. The appliance can be raised or lowered in this way. However, the gear unit must also be displaceable axially in the belt direction at the same time so as to afford the further possibility for automatically compensating for unevenness in floors.

BRIEF DESCRIPTION OF THE DRAWINGS

The invention will be explained more fully with reference to embodiment examples shown in the drawings.

DESCRIPTION OF THE PREFERRED EMBODIMENTS

Figure 1:
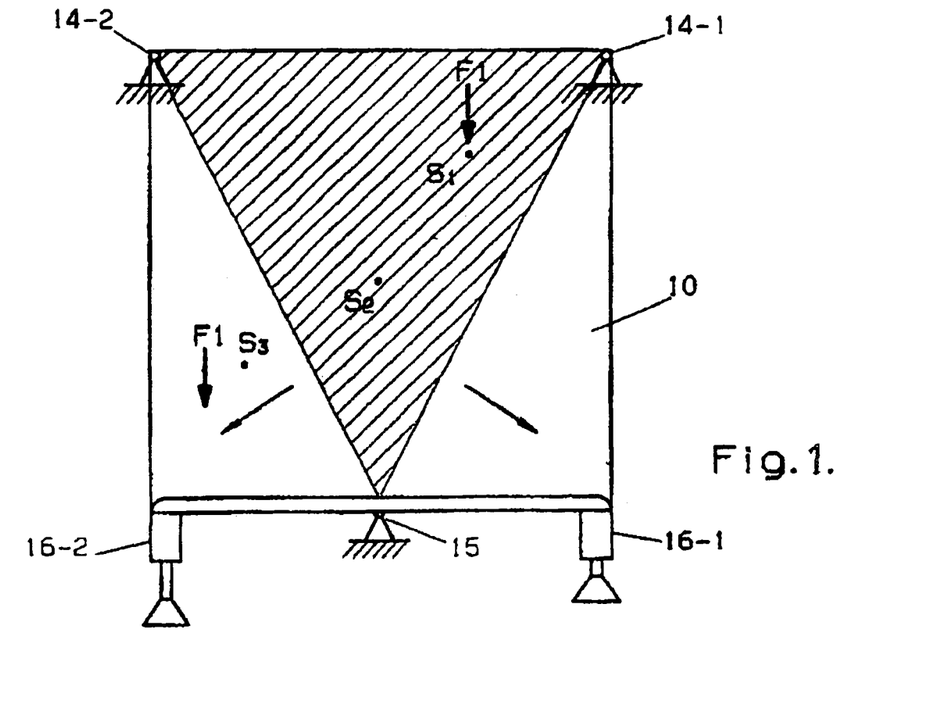
FIG. 1 is a diagram illustrating the function of the leveling system according to the invention.

FIG. 1 shows a bottom plate 10 of a household appliance 12, e.g., a washing machine, having four appliance feet 14-1, 14-2 (front) and 16-1 and 16-2 (rear) arranged at the underside of the household appliance 12. In a manner known per se, the appliance feet 14, 16 have a threaded rod 18 and a foot plate 20. By means of a prismatic, e.g., hexagonal, area 22 (see FIG. 3) which is formed by the foot plate 20 or by the threaded rod 18, the threaded rod can be rotated by a socket wrench until floor unevenness is compensated. When the household appliance 12 is installed between two other household appliances or pieces of furniture or elsewhere, the rear feet 16-1 and 16-2 are difficult to access. This problem is solved according to the invention in that the two rear appliance feet 16-1 and 16-2 are part of a cable pull system in which a statically determined state of the appliance is provided for the entire lifetime of the system. The leveling system comprises two leveling feet 16-1, 16-2 which are connected to one another by a cable or belt or chain 24 and which are installed instead of the normal rear screw feet and replace the latter.

Taking into consideration the total combination of four feet, including the rear leveling feet 16-1, 16-2 and the front feet 14-1, 14-2 which can be regulated manually, it will be seen that the general center of gravity S1 or S2 inside the triangle 14-1, 14-2, 15 can be shifted as required without changing the equilibrium situation in any way because the load F0 is always received by the two real feet 14-1, 14-2 and the virtual foot 15 (see FIG. 1). It is only when the center of gravity is shifted outside the triangle, e.g., at point S3, by means of a large load outside the triangle, e.g., at F1, that the arrangement would be changed in such a way that the foot 14-1 is lifted from the floor. However, by means of the run-inhibiting arrangement which will be described below, the triangle can be enlarged to a rectangle by means of a friction device and/or shock-damping device in the system over a certain period of time depending on the adjustment of the friction device or damping device and, therefore, loads due to a heavy washer basket outside the triangle F1, for example, can be absorbed without difficulty. When the basket and, therefore, the force F1 are removed again, the system levels into the original state again by itself.

Figure 2:
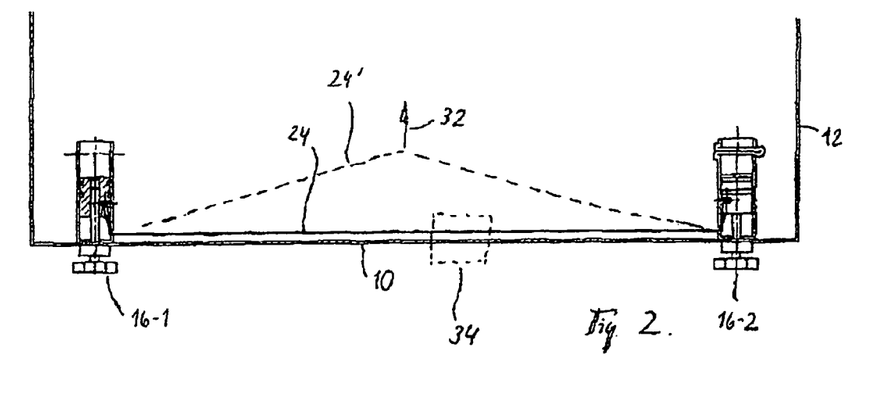
FIG. 2 is a schematic view of a household appliance with two leveling feet according to the invention.

The leveling system according to the invention will now be described in more detail. FIG. 2 shows that each of the appliance feet 16-1, 16-2 has a cylindrical housing 26 in which a piston 28 carrying an appliance foot plate 20 is arranged. This piston 28 has a receptacle 30 for the height-adjustable arrangement of the shaft 18 of the appliance foot plate 20, e.g., height-adjustable in that the receptacle space 30 is a threaded pocket hole or threaded through-hole into which the shaft 18 that is provided with the external thread is screwed by varying distances.

As was already mentioned, it is sufficient to provide only the two rear appliance feet 16-1, 16-2 with a cylindrical housing 26 that is outfitted with a piston in each instance. The cylindrical housings 26 are then in a tractive connection with one another by means of a cable connection, belt connection or chain connection 24 as is indicated in FIG. 2. Of course, it is possible, optionally, to provide another cable-tensioning device 32 by which the cable connection or the like 24' can be deflected, as is indicated in dashes in FIG. 2, so as to enable a joint height adjustment of the rear feet also, if required, without taking advantage of the manual adjustability. Normally, however, this expense may be dispensed with.

The tractive connection 24 shown in FIG. 2 can have, e.g., in the area of the cylindrical housing 16-1 and/or 16-2 or in the area of the belt, or the like, of the tractive connection itself, a damping device 34 which comprises, e.g., an arrangement which inhibits the passage of the cable or the like. This device 34 can simply be a clamp that frictionally clamps the cable or it can also be a pulley around which the cable or belt or chain is looped and which is rotatably supported in a frictional and/or damped manner.

A corresponding inhibiting device or damping device can also be part of the piston device which will be described in the following, e.g., in the form of an O-ring seal 134 in the piston. The appliance feet can be structural component parts that are injection molded from plastic, which lowers manufacturing costs, while the round cable or the flat belt 24 can be, e.g., pre-oriented plastic as is used, for example, for wrapping around packages. This flat belt is flexible but rigid against elongation and meets the intended goal particularly well. Alternatively, corresponding cables or chains can also be used.

The connection between the two appliance feet 16-1, 16-2 is carried out in such a way that the mechanical belt connection 24 has a force component in direction of the cylindrical housing axis 36. However, according to FIG. 3 and also FIG. 4, the belt 24 or the like is fastened to the movable piston 28, e.g., by means of a transverse pin 38 which is supported on the shoulders of a lateral groove in the piston 28 having the width of the belt 24. In the installation position shown in the drawing, the cylinder wall of the cylinder 26 prevents the pin 38 from exiting from the slot 40 formed in the piston 28. The belt 24 is then guided around a deflection edge 42 that is formed by the stationary cylindrical housing 26. When the belt 24 is pulled, the piston 28 moves downward and pushes the foot 20 further out of its housing, which causes the bottom of the appliance to be lifted. At the same time, the piston moves gradually upward on the other side of the appliance bottom, e.g., at the appliance foot 16-2, and the appliance foot moves closer to the bottom of the appliance in a corresponding manner and accordingly causes the appliance to be lowered at this location.

Figure 5:
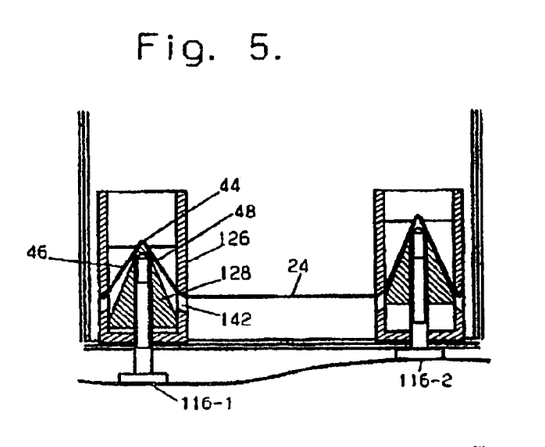
FIG. 5 shows a leveling system in which the belt or the like is fastened to the housing and is deflected by the piston tip around which the belt is looped.
Figure 6:
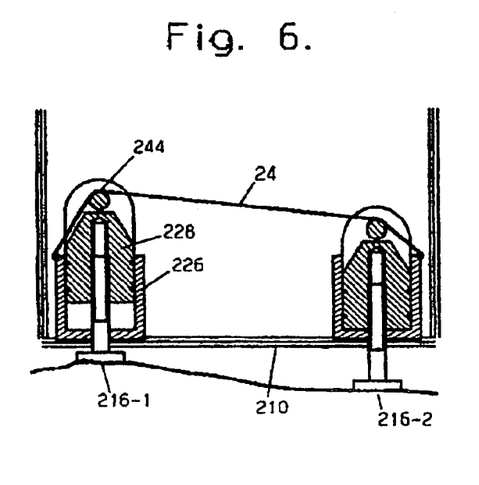
FIG. 6 shows a view similar to that in FIG. 5 in which the fastening is likewise carried out at the housing and a deflection roller is on the tip of the piston and the belt is tightened.
Figure 7:
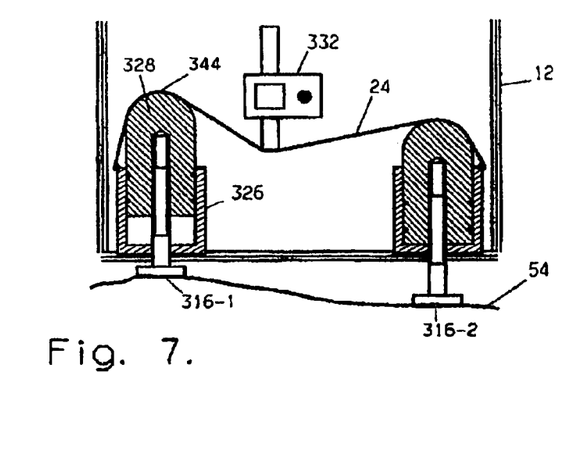
FIG. 7 shows an arrangement in a view similar to that in FIGS. 5 and 6 in which an additional tensioning device is provided.

Uneven floors can also be compensated in another manner as is shown in FIGS. 5, 6 and 7. According to FIG. 5, the cable or the belt 24 is fastened to the housing 126 and is guided outward over a deflecting point 44 formed by the piston 128, first through a slot 142 and then to the opposite foot 116-2 which has a similar construction. The advantage of this arrangement is that the belt is only loaded by half of the pressing force of the foot because the pressing force of the foot is distributed to two cable portions or belt portions 47, 49. Both embodiment forms, that according to FIG. 2 and that according to FIG. 5, have the advantage that the cable or belt 24 exits from the cylindrical housing 26 and 126, respectively, near the bottom plate 10 so that the bending load for the two housings remains relatively small. This is carried out differently in FIG. 6, wherein the belt or the cable 24 is also fastened to the housing 226 in a suitable manner, not shown in more detail, and is also guided via a deflection arrangement 144 at the tip of the piston 228 and in the direction of the other foot 216-2, but without being deflected again by the housing edge 226. Therefore, the load on the belt 24 is twice as high and the bending load of the feet is also greater because of the greater distance between the belt 24 and the fastening area at the bottom plate 210.

As was mentioned in the beginning, it is advantageous to provide the mechanical chain connection, belt connection or cable connection 24 with a friction device and/or damping device 34, 134 in order, for example, to prevent the belt 24 from rapidly sliding in and sliding out, e.g., during oscillation in the spin cycle of a washing machine, which could also cause wear in the belt. For this purpose, either a device 34, shown in the middle in FIG. 2, is used to damp the back-and-forth movement of the belt or, alternatively, the pistons by arranging, e.g., the friction device as friction rings, such as O-ring seals 134, carried in three grooves on the circumferential surface of the piston (see FIGS. 3 and 4).

For technical reasons relating to production, it is useful to manufacture the cylinder 26 and piston 28 from plastic. However, the pin 38 can be made of metal in order to give it greater stability. Since tearing of the cable arrangement 24 due to high stress cannot be ruled out, it is useful when the housing 26 for the piston 28 has stop devices 46 which limit the upward travel of the piston. When the belt tears or is not used for other reasons, leveling can also be carried out by screwing in or unscrewing the bolt 18 inside the piston 28.

For design reasons, the upper end of the cylindrical housing is advisably constructed so as to be open, in which case it is advantageous when the stop devices are formed by a pin or cotter pin 46 which reaches through cylinder walls.

Figure 3:
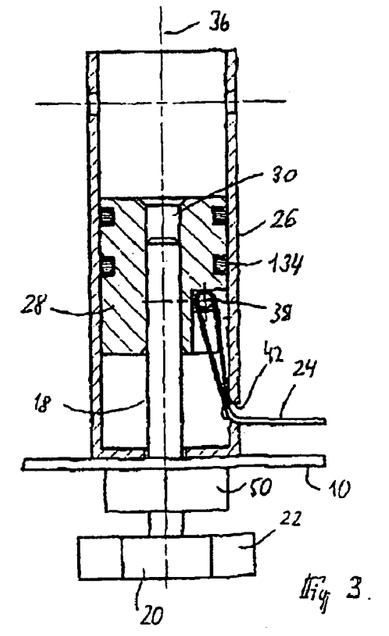
FIG. 3 is an enlarged view of the left-hand portion of FIG. 2 illustrating an embodiment form of a leveling foot.
Figure 4:
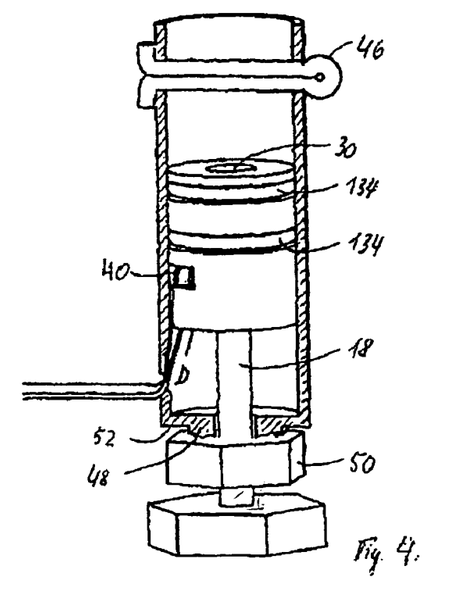
FIG. 4 is another view of the foot from FIG. 3 with associated stop formed by a cotter pin.

In order to mount the housing 26 at a bottom plate 10 or the like, it is advantageous when the cylindrical housing 26 has a shoulder 48 of plastic or metal which is penetrated by the shaft 18 of the foot plate 22. The shoulder 48 can be injection molded integral with the housing 26 or can be connected to the latter by gluing, welding, clipping in or screwing. The shoulder advisably has a circumferential thread for screwing on a fastening nut 50 so that the bottom plate 10 is clamped between the latter and the housing base 52, thereby securing the foot (see. FIG. 3).

By means of a traction device 332 which is shown in FIG. 7, the belt 24 can be pressed out of the straight path shown in FIGS. 5 and 6 so that more belt length is required and the pistons of the two foot devices 316-1 and 316-2 move downward jointly and lift up the leveled washing machine 12 in its entirety at its rear end. The device 332 can comprise a mechanical gear unit which could be actuated from the front side of the appliance.

A gear unit of the type mentioned above is known, for example, from DE 196 06 460 A1 or from DE 195 28 901 A1, wherein the deflection of the cable 24 could be carried out in this case instead of moving a foot up and down.

Figure 8:
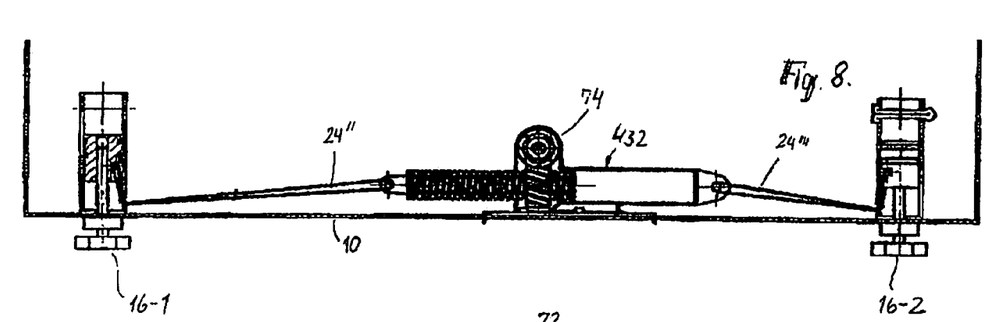
FIG. 8 shows an embodiment form in a view similar to FIG. 2 in which an additional tensioning device is formed by a gear unit.
Figure 9:
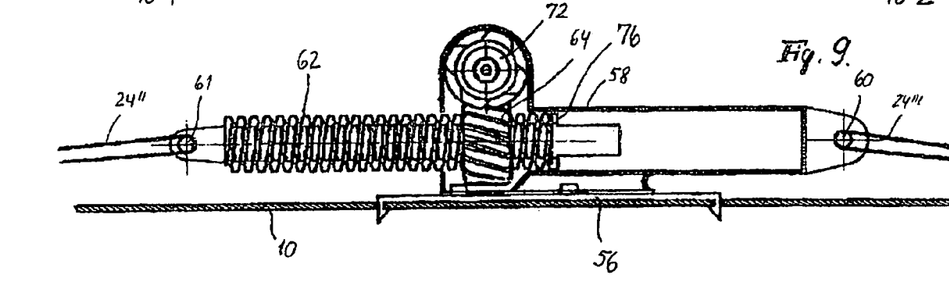
FIG. 9 shows an enlarged view of the gear unit.

In a view similar to FIG. 2, FIG. 8 shows another tensioning device 432 with a mechanical worm gear unit 74 comprising a slide arrangement 56 which is mounted on the bottom plate 10 and on which a gear unit housing 58 is arranged so as to be displaceable axially. The belt 24''' leading to the foot 16-2 is secured to a pin 60 at the right-hand end of the housing, while the belt 24'' coming from the other foot 16-1 is fastened by a pin 61 to the left-hand end of a threaded rod 62 referring to FIG. 9. The pin 61 is preferably made of plastic and a nut 64 constructed as a worm screw determines its entry into and exit from the housing 58. The outer worm of the nut 64 is driven by a worm gear 66 which can be rotated via a slip clutch 72 by means of a drive rod 68 from the front side of the appliance (see arrow 70). The advantage of the system is that both feet can be moved up and down jointly with only one individual operating knob, wherein leveling that is needed due to an uneven floor can also take place automatically at the same time owing to the displaceability of the gear unit.

Figure 10:
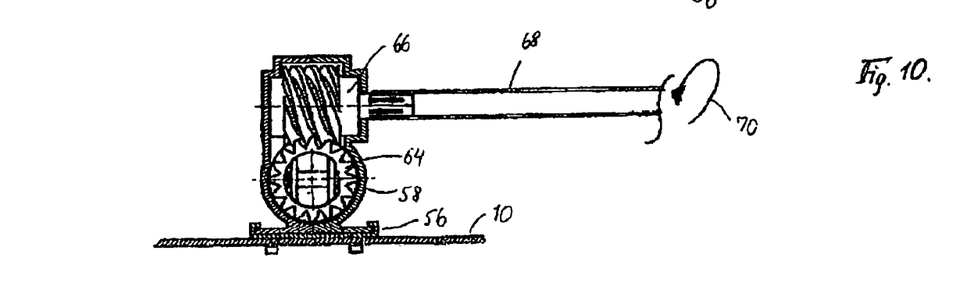
FIG. 10 shows a view of the drive unit of the gear unit which is accessible from the front.

When the drive 70 is actuated from the front side of the washing machine, it rotates the drive rod 68 and, therefore, the worm gear 66 in the housing 58, so that the pinion or nut 64 is rotated to the right or left and the gear unit rod 62 is displaced axially to the right or to the left. A displacement toward the right, referring to FIG. 9, would result in a tightening of the two cables 24'' and 24''', which would result in a simultaneous lifting of the appliance at its rear end, while, conversely, a displacement of the threaded rod 62 toward the left, referring to FIG. 9, causes the rear end of the appliance to be lowered because the feet then move gradually upward with the associated piston and accordingly lower the appliance. At the same time, due to the displaceability of the housing 58 in the slide carrier 56 (see particularly FIG. 10), unevenness in the floor can be compensated and these leveling processes take place automatically. The slip clutch 72 prevents overloading of the belt or cable 24. A stop pin 76 prevents the threaded rod 62 from accidentally rotating out of the nut 64.

Figure 11:
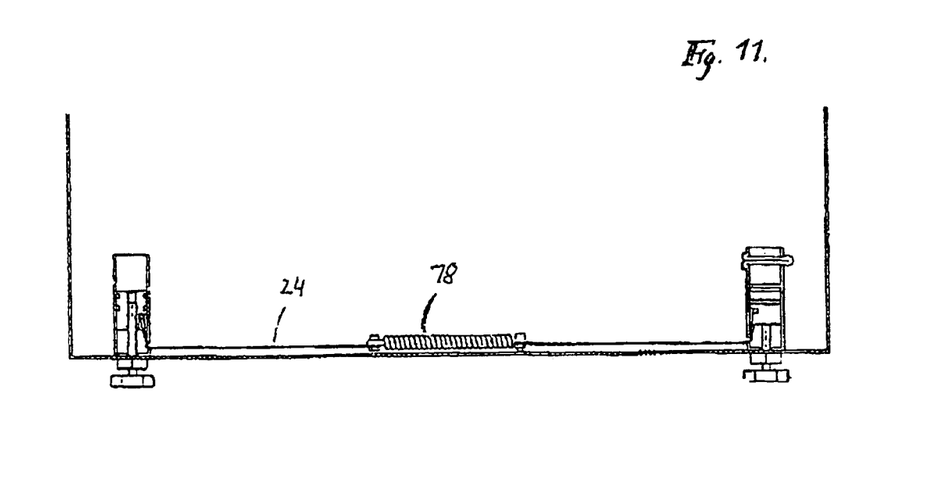
FIG. 11 is a view similar to that in FIG. 2 showing another embodiment form.

It has been shown that many types of washing machine exhibit even better standing behavior when the spring stiffness of the belt 24 or cable is reduced by an additional spring 78, according to FIG. 11, which is arranged in series with the cable.

COMMERCIAL APPLICABILITY

The invention is commercially applicable in the kitchen appliance industry.

While the foregoing While the foregoing description and drawings represent the present invention, it will be obvious to those skilled in the art that various changes may be made therein without departing from the true spirit and scope of the present invention.

The invention claimed is:

1. A leveling system for household appliances comprising:
appliance feet adapted to be arranged at the underside of a household appliance and adjustable in height at least partly by a traction element so as to make it possible to adjust the height of the household appliance and/or to adapt to unevenness in floors;
wherein only two rear appliance feet have, in each instance, a cylindrical housing fastened to the underside of the household appliance;
in each cylindrical housing there being arranged a piston which carries an appliance foot plate;
said traction element joining the pistons of the appliance feet;
said pistons each having a receptacle for height-adjustable arrangement of a shaft of the appliance foot plate;
wherein the cylindrical housings are in a tractive connection with one another by a mechanical chain connection, belt connection or cable connection, the tractive connection having a force component in direction of a cylindrical housing axis; and
wherein the mechanical chain connection, belt connection or cable connection and/or the cylinder or cylindrical housing can have an inhibiting or damping device which inhibits the passage of the chain, belt or cable or the displacement of the piston in the cylinder, wherein the friction device is formed by friction rings which are carried in ring grooves in the circumferential surface of the piston or, in that, alternatively, the mechanical connection is influenced by a friction device.

2. The leveling system for household appliances according to claim 1 wherein the belt or the like is fastened to the piston and guided around a deflection arrangement that is formed or carried by the stationary cylindrical housing.

3. The leveling system for household appliances according to claim 1 wherein the belt or the like is fastened in the stationary cylindrical housing and guided around a deflection arrangement that is formed or carried out by the piston.

4. The leveling system for household appliances according to claim 1, wherein the arrangement comprising the cylinder and piston is made at least partially of plastic.

5. The leveling system for household appliances according to claim 1, wherein the piston supports a cross-pin or a roller which holds or deflects the belt or the like.

6. The leveling system for household appliances according to claim 5, wherein a bearing support or deflection device is arranged in the vicinity of the plane of the underside or bottom plate carrying the appliance feet.

7. The leveling system for household appliances according to claim 1, wherein the cylindrical housing has a fastening device for fastening the cable, belt or chain.

8. The leveling system according to claim 1, wherein the housing for the piston forms stop devices for limiting the travel of the piston.

9. The leveling system according to claim 8, wherein the cylindrical housing is open at its free end, and in that the stop devices are formed by a cotter pin or bolt which extends through the cylinder walls.

10. The leveling system according to claim 1, wherein the cylindrical housing has an opening in its lower area near the fastening through which the belt or the like is guided and deflected.

11. The leveling system according to claim 1, wherein the belt is a steel belt or an oriented or fiberglass-reinforced plastic belt.

* * * * *